United States Patent
Beauvais

(10) Patent No.: US 10,486,717 B2
(45) Date of Patent: *Nov. 26, 2019

(54) HYDRO-ELECTRIC SITE AND METHOD FOR CONSTRUCTING A PENSTOCK

(71) Applicant: MINRAIL INC., Val-d'Or (CA)

(72) Inventor: Marc R. Beauvais, Val-d'Or (CA)

(73) Assignee: MINRAIL INC., Val-d'Or (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,394

(22) Filed: Jan. 31, 2019

(65) Prior Publication Data

US 2019/0161094 A1 May 30, 2019

Related U.S. Application Data

(63) Continuation of application No. 14/890,697, filed as application No. PCT/CA2014/000328 on Apr. 4, 2014, now Pat. No. 10,196,072.

(60) Provisional application No. 61/823,021, filed on May 14, 2013.

(51) Int. Cl.

| | |
|---|---|
| *E21D 9/02* | (2006.01) |
| *E21C 41/16* | (2006.01) |
| *B61B 3/02* | (2006.01) |
| *B61B 13/02* | (2006.01) |
| *E02B 7/20* | (2006.01) |
| *E02B 9/02* | (2006.01) |
| *E21F 13/02* | (2006.01) |

(52) U.S. Cl.
CPC ............... *B61B 3/02* (2013.01); *B61B 13/02* (2013.01); *E02B 7/20* (2013.01); *E02B 9/02* (2013.01); *E21C 41/16* (2013.01); *E21D 9/02* (2013.01); *E21F 13/02* (2013.01)

(58) Field of Classification Search
CPC .................................. E21D 9/02; E21C 41/16
USPC ........ 299/18, 19, 42, 43, 56, 64, 31, 33, 70; 405/132, 139, 148
See application file for complete search history.

(56) References Cited

U.S. PATENT DOCUMENTS

| | | | | |
|---|---|---|---|---|
| 2,701,711 A | * | 2/1955 | Demo | E21D 1/00 173/144 |
| 4,213,653 A | * | 7/1980 | Grenia | E21C 41/18 299/11 |
| 10,196,072 B2 | * | 2/2019 | Beauvais | B61B 3/02 |

FOREIGN PATENT DOCUMENTS

| | | | |
|---|---|---|---|
| JP | 60-5905 | * | 1/1985 |
| JP | 60-5906 | * | 1/1985 |

* cited by examiner

*Primary Examiner* — Sunil Singh
(74) *Attorney, Agent, or Firm* — BCF LLP

(57) ABSTRACT

The present disclosure relates to a method for constructing a penstock. A path of the penstock to be dug along a central axis of a hydro-electric site within a rock mass is planned. A lower shaft is excavated, the lower shaft intersecting the path of the penstock. A starting station extending from the lower shaft and from a bottom of the path of the penstock is excavated. The penstock is excavated. An arrival station is excavated and is overhanging above a top of the penstock. An expansion chamber broadening a width of the penstock and broadening a width of the lower shaft near the bottom of the path of the penstock is excavated. A hydro-electric site comprising the penstock is also disclosed.

9 Claims, 9 Drawing Sheets

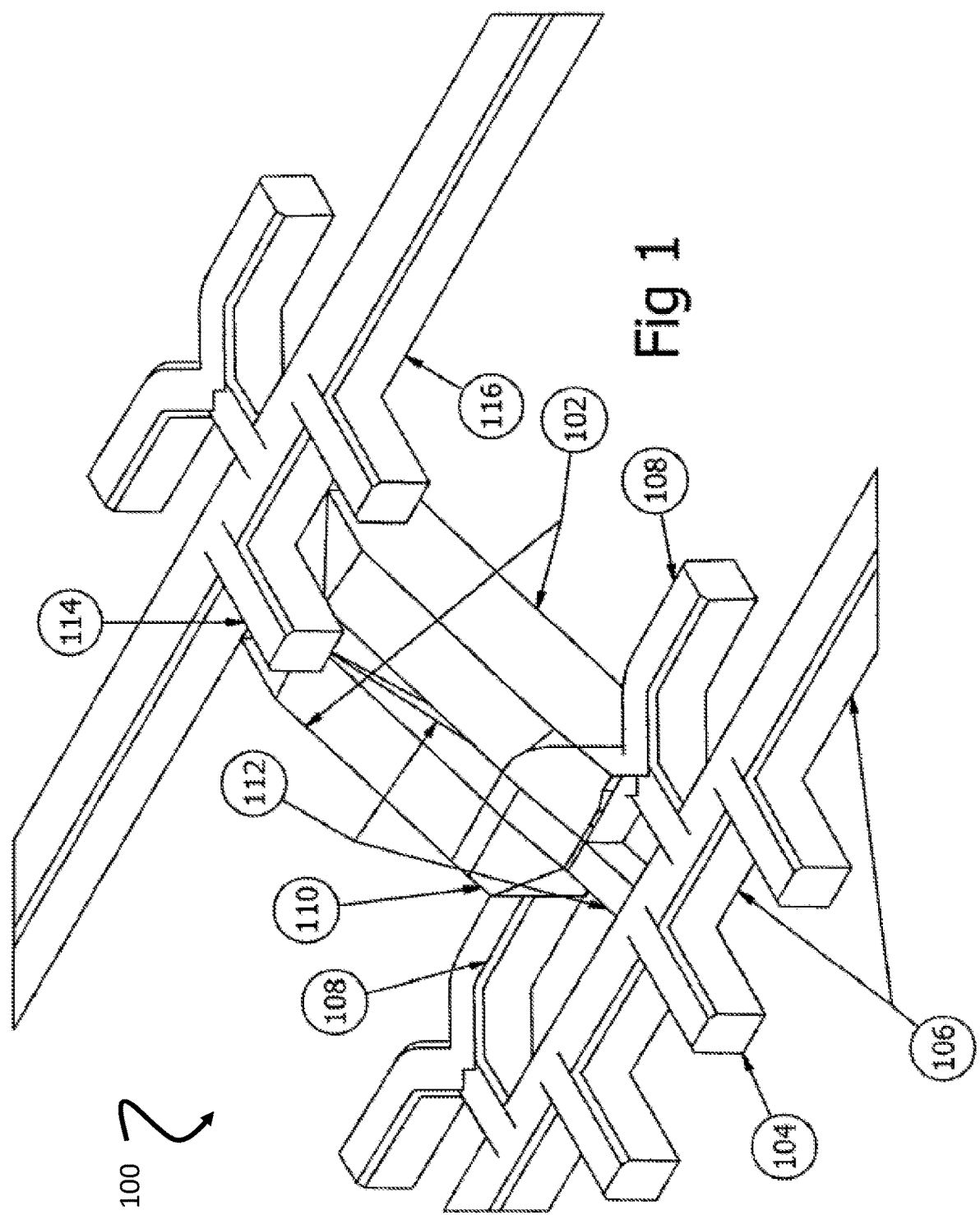

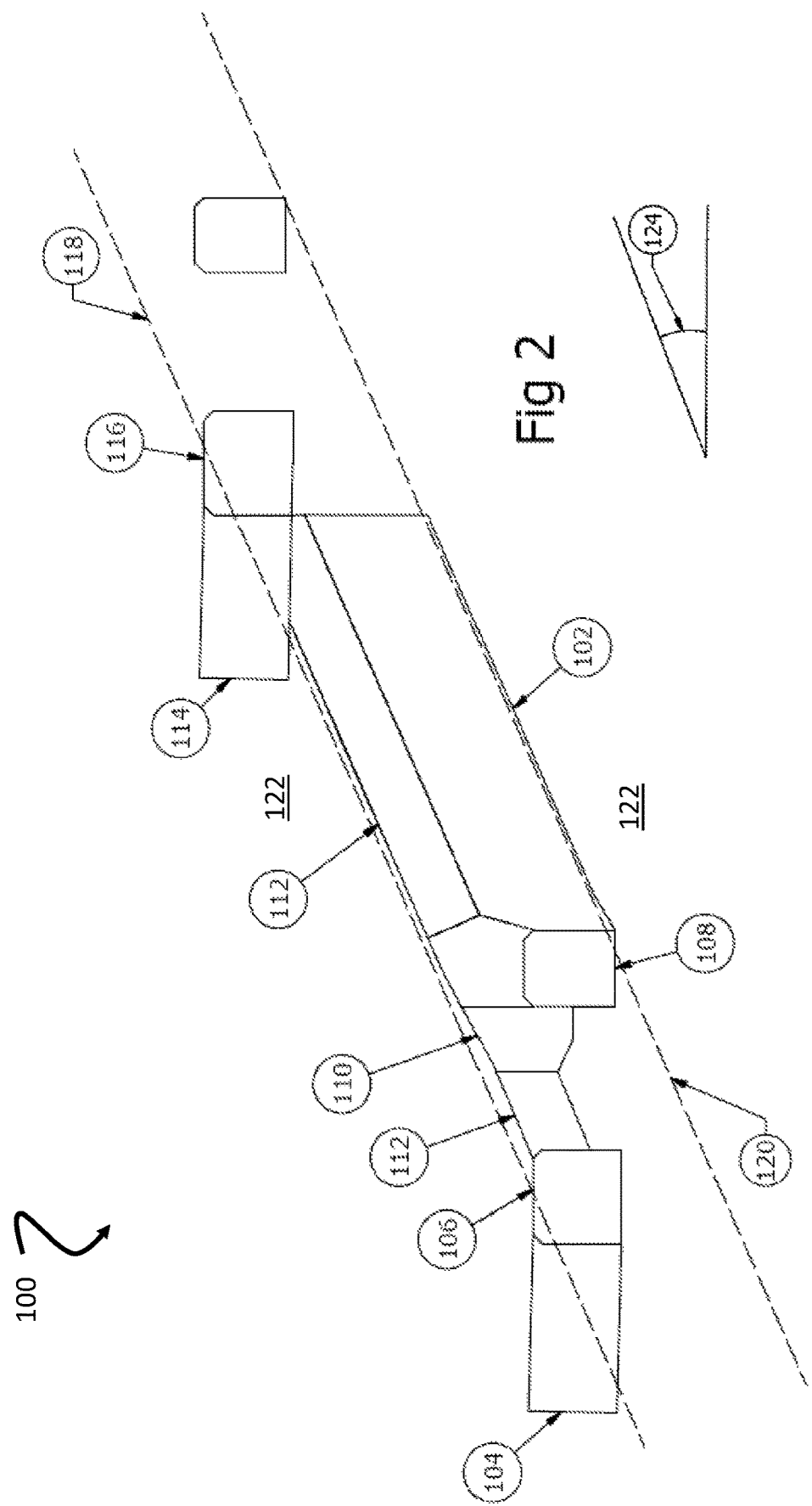

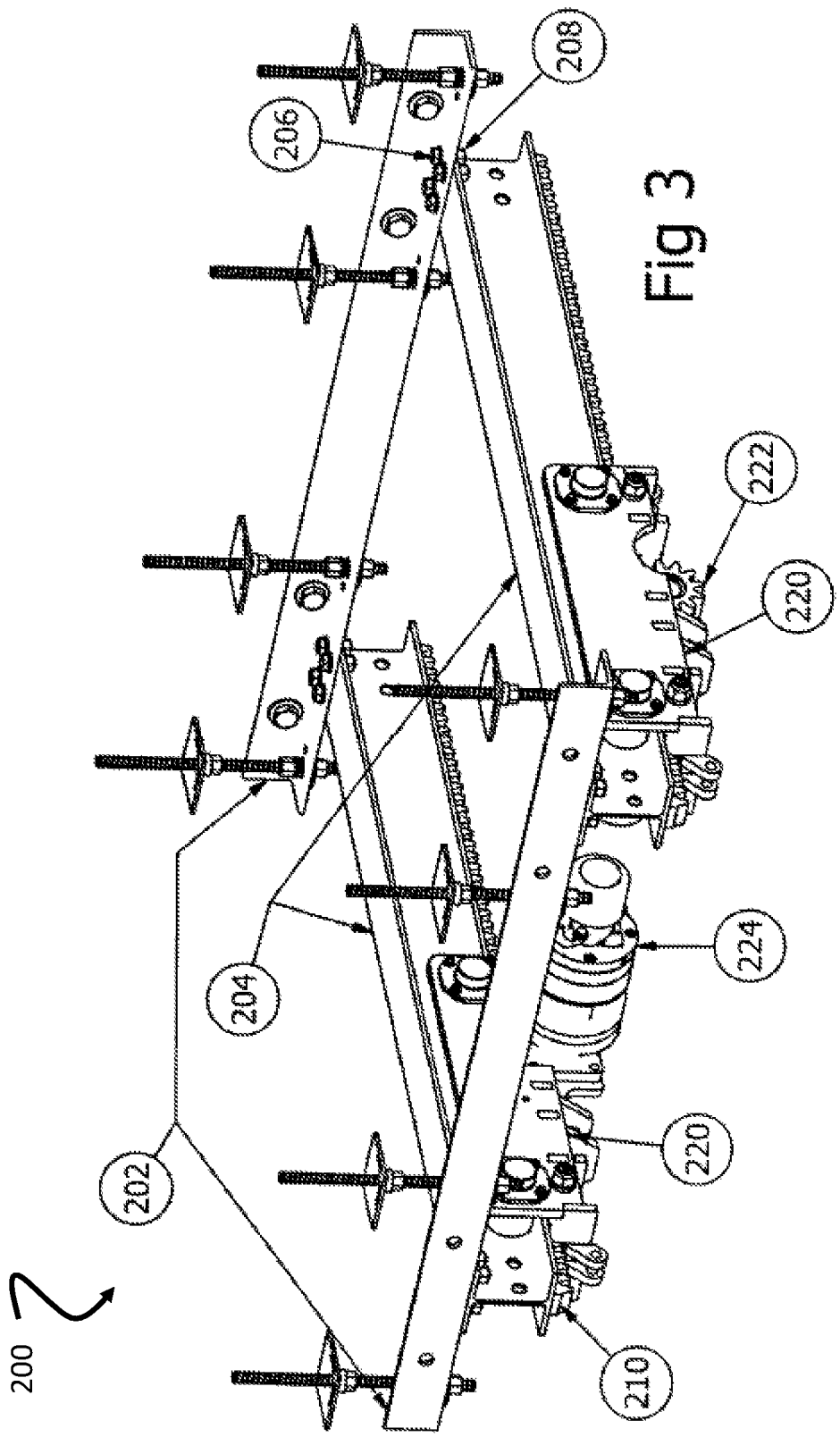

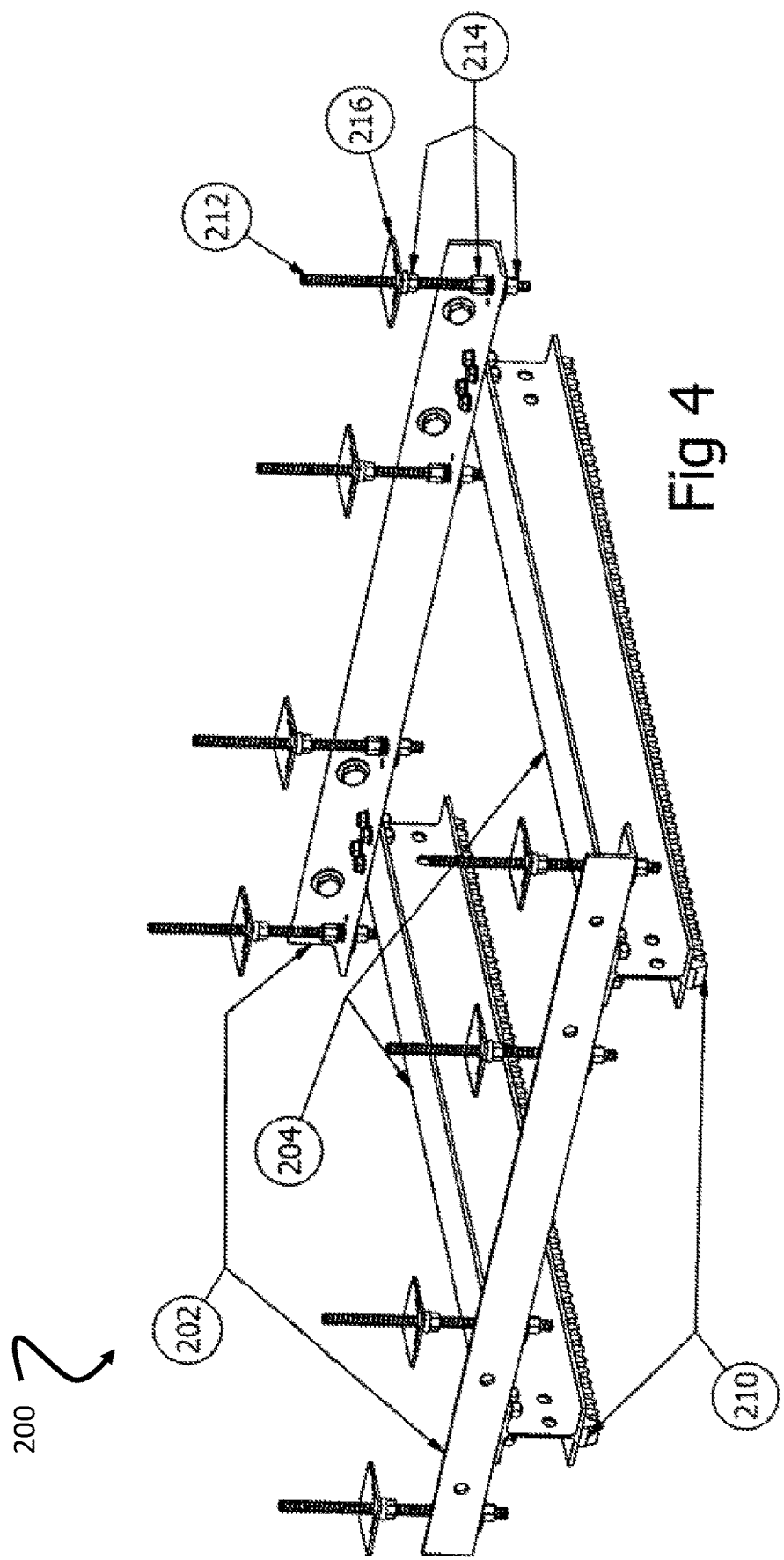

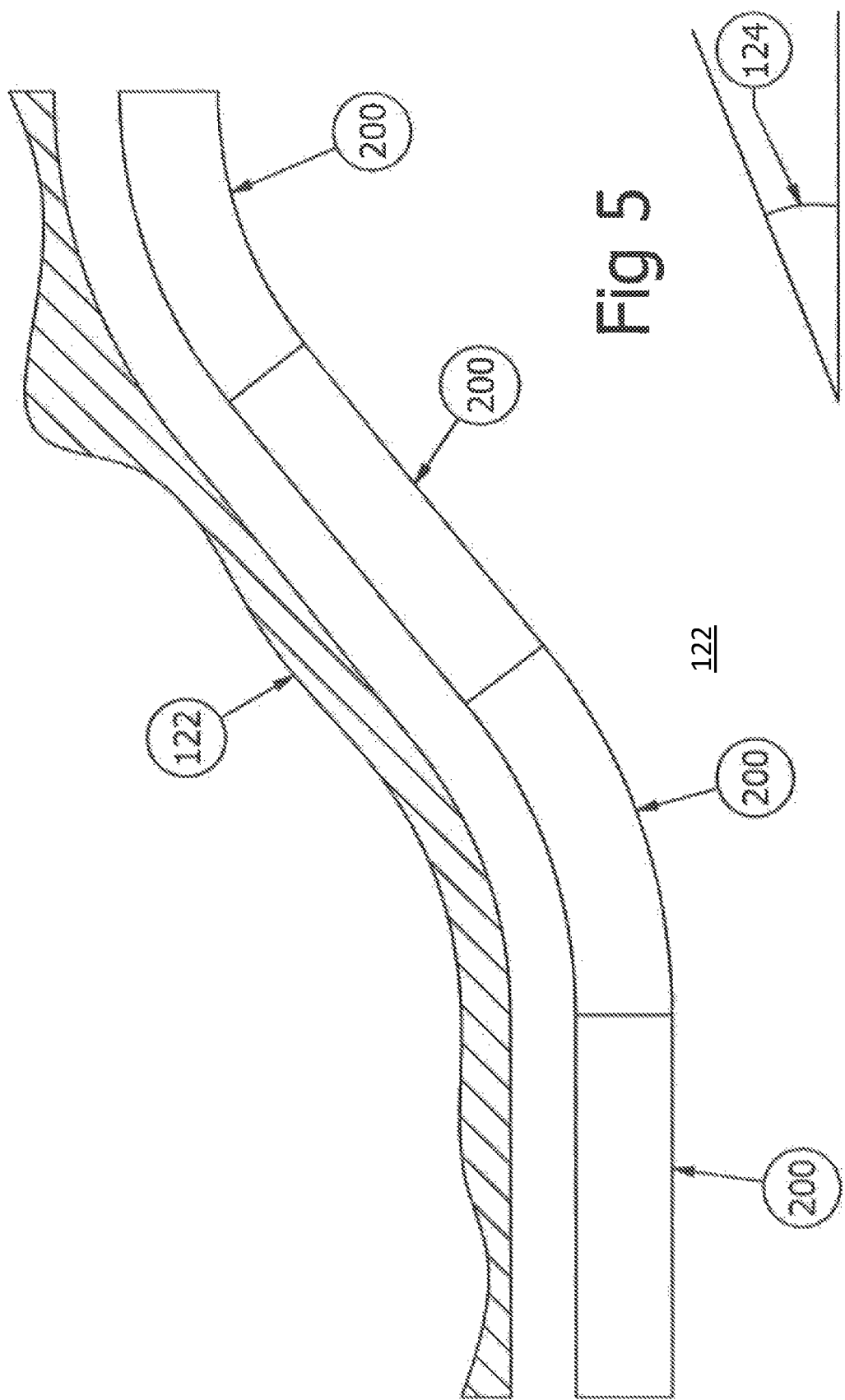

- 302 Determining a localization of an ore body
- 304 Planning a path of an extraction shaft passing through the ore body at an angle between 10 and 45 degrees from horizontal
- 306 Excavating a lower shaft, the lower shaft intersecting the path of the extraction shaft
- 308 Excavating a starting station extending from the lower shaft and from a bottom of the path of the extraction shaft
- 310 Excavating the extraction shaft
- 312 Excavating an expansion chamber broadening a width of the extraction shaft near the bottom of the path of the extraction shaft
- 314 Excavating a removal shaft connecting the expansion chamber to the lower shaft at an offset from the starting station
- 316 Excavating an arrival station overhanging above a top of the extraction shaft
- 318 Excavating a upper shaft extending from the arrival station
- 320 Installing an overhead rail system on an upper surface of the extraction shaft

Figure 6

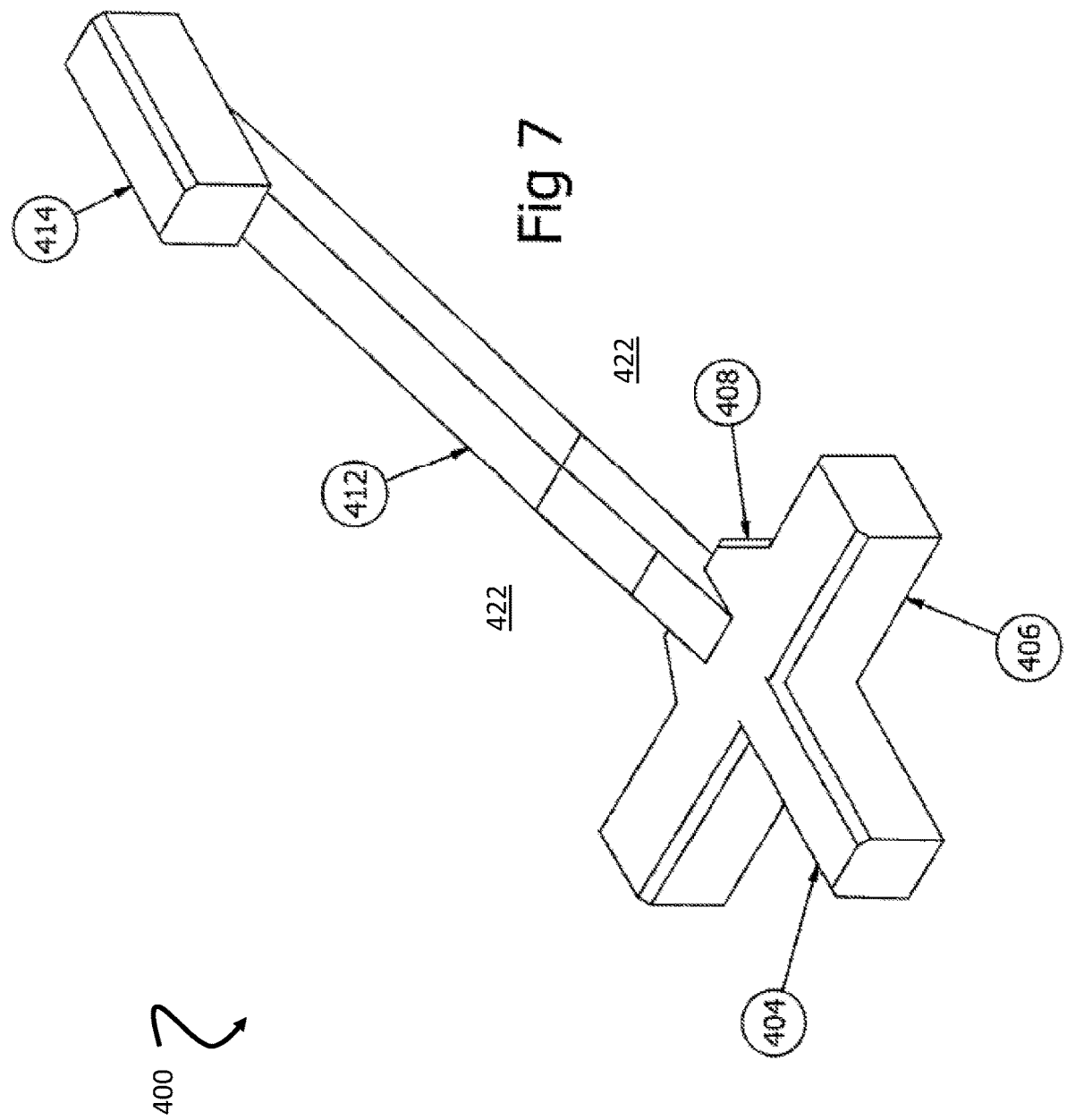

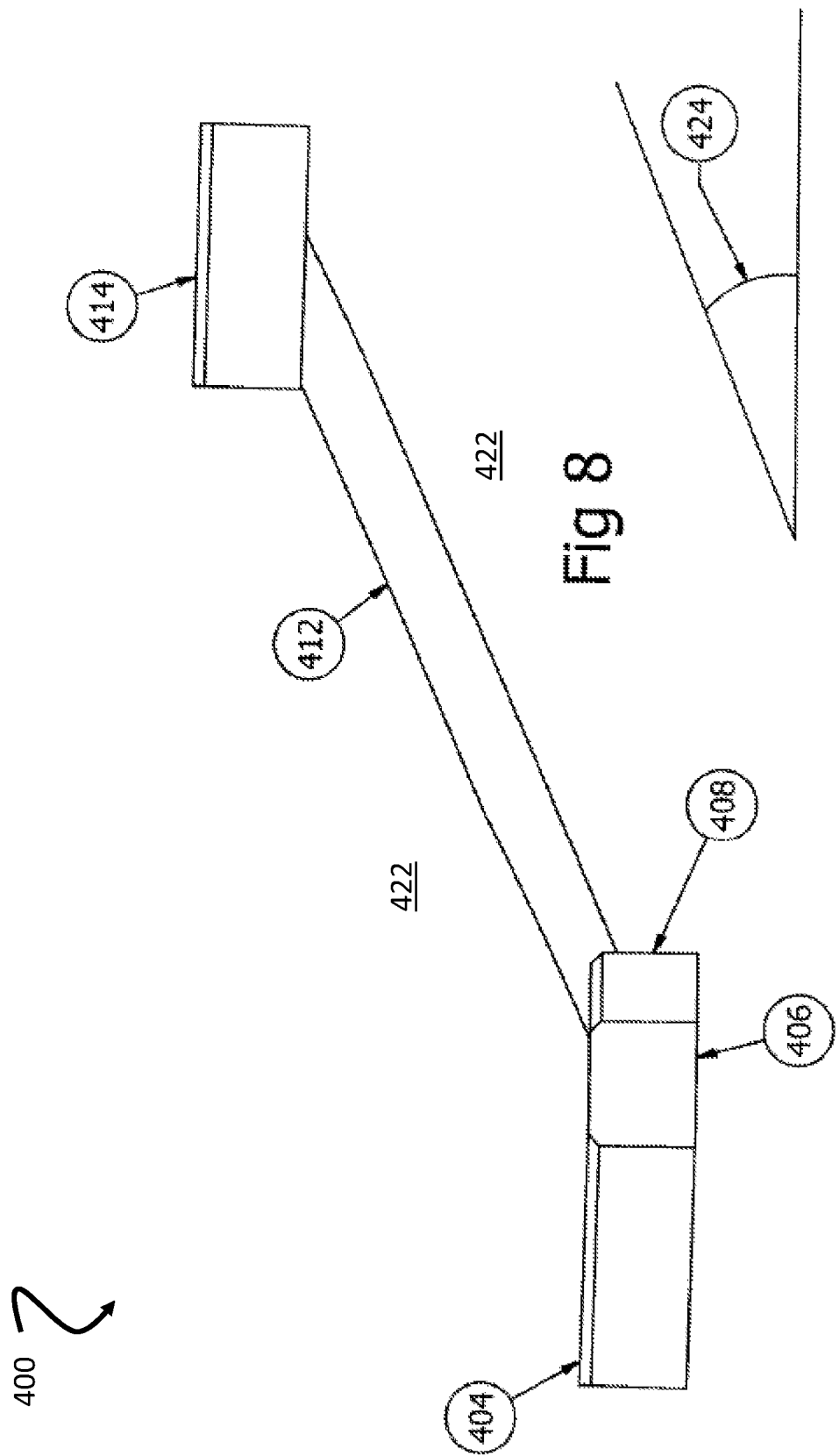

HYDRO-ELECTRIC SITE AND METHOD FOR CONSTRUCTING A PENSTOCK

CROSS-REFERENCE

The present application is a continuation of U.S. patent application Ser. No. 14/890,697 filed on Nov. 12, 2015, which is a national entry of International Patent Application No. PCT/CA2014/000328 filed on Apr. 4, 2014, which claims priority to U.S. Provisional Patent Application No. 61/823,021, filed on May 14, 2013, the entirety of each of which is incorporated herein by reference.

TECHNICAL FIELD

The present disclosure relates to the field of underground construction. More specifically, the present disclosure relates to a hydro-electric site and to a method for constructing a penstock.

BACKGROUND

Underground mining, also called hard rock mining, relies on the excavation (i.e. digging) of substantially vertical and substantially horizontal galleries or tunnels, commonly called "shafts". Elevators and lifts are used in vertical shafts while wagons are used in horizontal shafts for transport of ore material, equipment, and personnel.

A commercially exploitable ore body oftentimes follows geological formations that may be at shallow angles, for example at 45 degrees or less from horizontal. Access to these formations using only horizontal and/or vertical shafts is not efficient. There are currently no available techniques and equipment capable of operating in mine shafts dug at shallow angles.

Therefore, there is a need for technologies capable of economically exploiting ore bodies at shallow angles. There are also needs for improvements to existing methods of digging underground tunnels at shallow angles, for other applications.

BRIEF DESCRIPTION OF THE DRAWINGS

Embodiments of the disclosure will be described by way of example only with reference to the accompanying drawings, in which:

FIG. 1 is a perspective view of a mining site according to an embodiment;

FIG. 2 is a side elevation view of the mining site of FIG. 1;

FIG. 3 is a perspective view of a section of an overhead rail system according to an embodiment;

FIG. 4 is a perspective view showing attachments of the overhead rail system of FIG. 3 to the roof of the extraction shaft;

FIG. 5 is side elevation of an example path of the overhead rail system;

FIG. 6 is a flow diagram showing operations of a shallow angle mining method;

FIG. 7 is a perspective, partial view of a hydro-electric site according to an embodiment;

FIG. 8 is a side elevation, partial view of the hydro-electric of FIG. 7.

DETAILED DESCRIPTION

Figure 9:
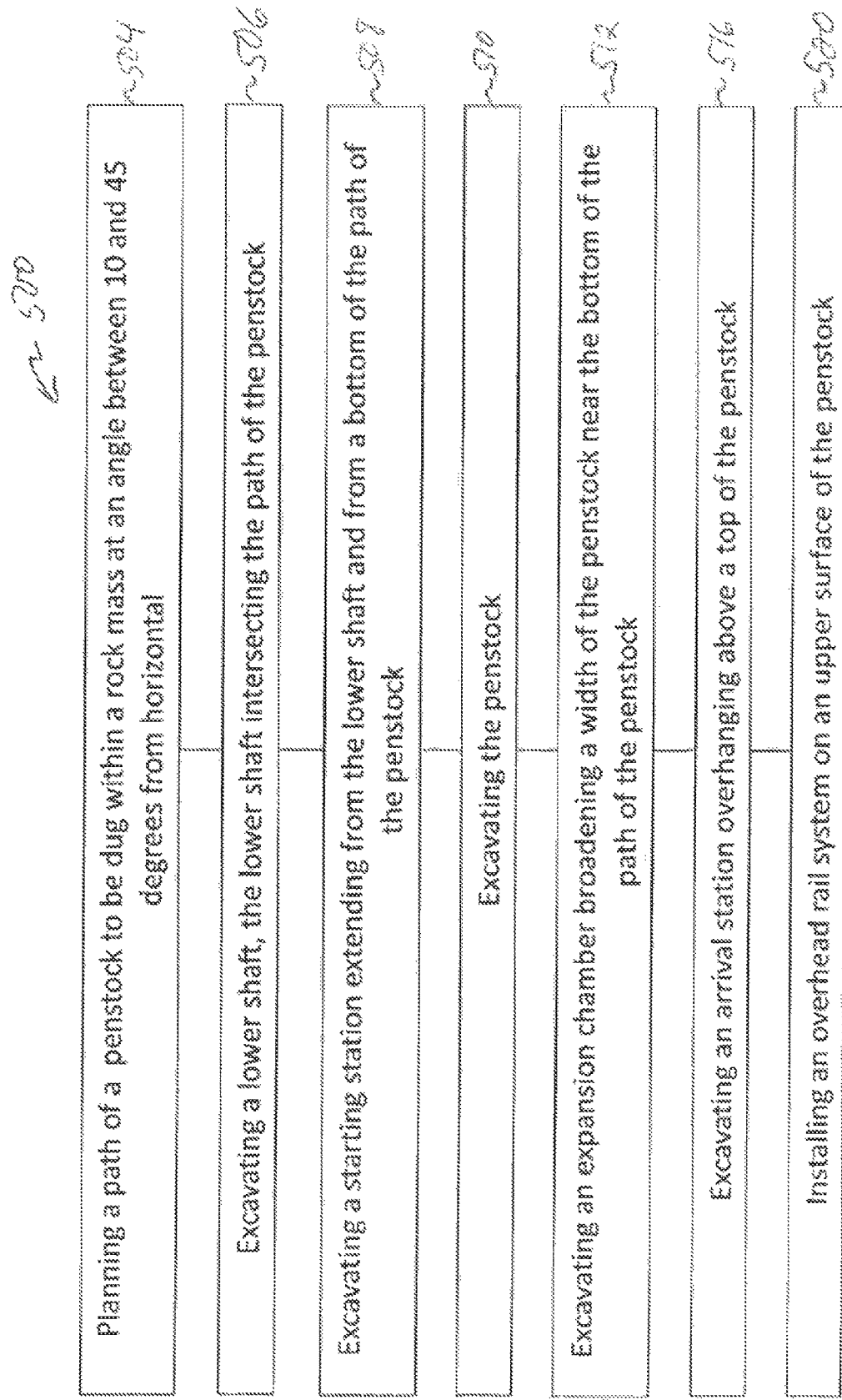
FIG. 9 is a flow diagram showing operations of a method for constructing a penstock.

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to ore bodies being at shallow angles.

The method disclosed herein allows mechanical extraction of rock and ore deposits at any angle, including along shallow incline planes for example, without limitation, within a range between 10 and 45 degrees relative to horizontal.

The following terminology is used throughout the present disclosure:

Mining site: a location including underground space where mining activities take place.
Ore body: material, for example mineral material, having commercial value, naturally present underground.
Shaft: excavation passage in rock, a gallery or tunnel; in the context of the present disclosure, a shaft can be horizontal, vertical, or inclined.
Extraction shaft: a shaft passing through the ore body, for exploiting the ore body.
Lower shaft: a shaft providing access to a mining site at a point lower than the ore body.
Starting station: a room provided at the bottom of the extraction shaft, for installation of various equipment.
Arrival station: a room provided at the top of the extraction shaft, for installation of various equipment.
Overhang: a projection of a part of an area above another area.
Upper shaft: a shaft providing access to a mining site at a point higher than the ore body.
Horizontal, perpendicular, parallel, straight: these terms are not to be construed in the absolute sense, but generally in the context of the present disclosure, which is related to underground mining.
Expansion chamber: space provided near the bottom of the extraction shaft, for receiving extracted material.
Removal shaft: a shaft for removing extracted material toward the lower shaft.
Laterally removed from: at a distance from.
Penstock: a water conduit, for example installed in a hydro-electric power plant, between a water dam and a turbo-generator.

Referring now to the drawings, FIG. 1 is a perspective view of a mining site according to an embodiment. FIG. 2 is a side elevation view of the mining site of FIG. 1. FIGS. 1 and 2 illustrate an ideal mining site having symmetry between major components, most of which being depicted with straight lines. In practice, an actual mining site will differ. FIGS. 1 and 2 are highly schematic and are provided for illustration purposes and do not limit the present disclosure.

Referring at once to FIGS. 1 and 2, a mining site 100 comprises an ore body 102, a starting station 104, a lower shaft 106, one or more removal shafts 108, an expansion chamber 110, an extraction shaft 112, an arrival station 114, and an upper shaft 116. FIG. 2 further shows a hanging wall 118 of the ore body 102, a foot wall 120 of the ore body 102, and rock material 122 surrounding the ore body 102.

The ore body 102 is any rock mass having an economical value. The starting station 104 and the arrival station 114 are areas arranged for the installation of various equipment (not shown) including for example transport equipment, drilling equipment, electric, hydraulic and/or pneumatic power distribution systems, industrial water distribution systems, and the like. The lower shaft 106 is generally horizontal, provides access to the mining site 100 and allows hauling of rock debris. The expansion chamber 110 provides space for installation of equipment such as a scraper winch (not shown), also providing clearance for receiving ore material following blasting within the ore body 102. The removal shaft 108 (or shafts) connects the expansion chamber 110 to the lower shaft 106 laterally removed from the starting station 104. The removal shaft 108 allows extraction of rock debris present in the expansion chamber 110. The extraction shaft 112 is excavated along the hanging wall 118 and a central axis of the mining site 100. The extraction shaft 112 allows access to the ore body 102, for drilling and blasting of the ore body 102. The extraction shaft 112 also provides for removal of ore and waste rock material towards the removal shaft 108. The upper shaft 116 is generally horizontal and provides access to the arrival station 114. The hanging wall 118 and the foot wall 120, respectively, are upper and lower areas of contact between the ore body 102 and the surrounding rock material 122.

In contrast with the conventional practice of digging substantially vertical or substantially horizontal mine shafts, the extraction shaft 112 is excavated at any angle, including at a shallow angle for example varying between 10 and 45 degrees from horizontal. As a non-limiting example, FIG. 2 shows an incline 124 of the extraction shaft 112 at about 25 degrees from horizontal. The value of the incline 124 is for illustration purposes and the extraction shaft 112 could be dug at other angles. In particular, the angle of the incline 124 may vary along a path of the extraction shaft 112.

Exploitation of the mining site 100 is facilitated by installing an overhead rail system on an upper surface, i.e. a roof or ceiling, of the extraction shaft 112, substantially at a level of the hanging wall 118. FIG. 3 is a perspective view of a section of an overhead rail system according to an embodiment. FIG. 4 is a perspective view showing attachments of the overhead rail system of FIG. 3 to the roof of the extraction shaft. Referring at once to FIGS. 3 and 4, an overhead rail system comprises a plurality of rail sections 200, a single rail section 200 being shown on FIGS. 3 and 4. Each rail section 200 comprises a pair of substantially parallel, transversal support beams 202, a pair of parallel rail beams 204 attached in substantially perpendicular manner to the transversal support beams 202 by use of bolts 206 and nuts 208, and a pair of rack line sections 210 fixedly mounted, for example by welding, underneath the rail beams 204. The rail section 200 is configured for attachment to a solid overhead structure, such as the rock material 122 at the level of the hanging wall 118, using a plurality of anchor bolts 212. Each anchor bolt 212 is mounted to one of the transversal support beams 202 using nuts 214, additional nuts 214 ensuring that washers 216 are maintained flush on a surface of the rock material 122. Mounting a plurality of rail sections 200 in series forms a continuous overhead rail system having continuous parallel rails and continuous rack lines.

A pair of chariots 220, or trolleys, is supported by the overhead rail system. Each chariot 220 comprises a drive sprocket, also called pinion 222, having teeth matching teeth of the rack line sections 210. At least one of the chariots 220 is driven by a drive system 224 connected to the pinions 222 of the chariots 220, the drive system 224 comprising a brake, a clutch and a motor, which may comprise an electric motor, a pneumatic motor, or a hydraulic motor receiving power from power systems located in the starting station 104 or in the arrival station 114, or both. The drive system 224 may comprise two (2) motors respectively driving each of the chariots 220.

A plurality of rail sections 200 are mounted along a length of the extraction shaft 112, for example forming a continuous overhead rail system between the starting station 104 and the arrival station 114. FIG. 5 is side elevation of an example path of the overhead rail system. A plurality of rail sections 200 attached to the rock material 122 follow a path of the extraction shaft 112. Though the rail beams 204 as illustrated on FIGS. 3 and 4 are straight, they can be given a moderate curve in order to follow a path of the extraction shaft 112, diverging to the left or to the right, or following a variation of the incline 124 of the extraction shaft 112 relative to the horizon. There is no limitation to the angle of the incline 124. The chariots 220 are capable to seamlessly move between rail sections 200, at angles gradually varying from horizontal to vertical.

A mobile platform (not shown), or cart, carrying mining equipment (not shown) such as for example a scraper winch, a slusher, a long haul loader, explosive charges, and drills, is supported to the overhead rail system by the chariots 220. Like the motor of the brake, clutch and motor assembly 224, the equipment carried by the mobile platform is powered by electric, pneumatic or hydraulic power systems located in the starting station 104 and in the arrival station 114. Equipment carried by the mobile platform is used to extract ore material from the ore body 102. Of course, the mobile platform can also be used for carrying workers along the extraction shaft 112. Other types of load can be supported by the overhead rail system and the present mention of a platform is not intended to limit the present disclosure.

FIG. 6 is a flow diagram showing operations of a shallow angle mining method. A sequence 300 comprises several operations, some of which are optional and some of which may be executed in various order. The sequence 300 is therefore provided for illustration purposes and the shown order of operation does not limit the present disclosure. In the sequence 300, a localization of an ore body is determined at operation 302. A path of an extraction shaft passing through the ore body, for example at an angle between 10 and 45 degrees from horizontal, is planned at operation 304. Operation 306 includes excavating a lower shaft that intersects the path of the extraction shaft. Excavation of a starting station extending from the lower shaft and from a bottom of the path of the extraction shaft is made at operation 308. The extraction shaft per se is excavated at operation 310. If desired, an expansion chamber broadening a width of the extraction shaft near the bottom of the path of the extraction shaft is excavated at operation 312 and a removal shaft connecting the expansion chamber to the lower shaft laterally removed from the starting station is excavated at operation 314. Operation 316 includes excavating an arrival station overhanging above a top of the extraction shaft. An upper shaft extending from the arrival station is also excavation at operation 318. To facilitate exploitation of a mining site produced using the above operations, an overhead rail system may be installed on an upper surface of the extraction shaft at operation 320. The overhead rail system can be used for carrying equipment, extracted ore material, and workers up and down the extraction shaft.

Referring again to FIGS. 1 and 6, without limiting the sequence 300, the various excavation operations can be conducted so that the lower shaft is generally horizontal and generally perpendicular to the extraction shaft, the station being generally perpendicular to the lower shaft, the starting station being generally perpendicular to the lower shaft, the upper shaft being generally horizontal, perpendicular to the arrival station shaft, parallel to the lower shaft and perpendicular to the extraction shaft. Of course, constraints of a particular mining site and location of ore bodies within the mining site will be so that variations from the idealized images of FIGS. 1 and 2 may be required.

Various embodiments of the shallow angle mining method, as disclosed herein, may be envisioned. Such embodiments may support digging of inclined tunnels for other applications including, without limitation, forced conduits and penstocks for hydroelectric applications, underground transport of mining materials (other than through ore bodies), passages for hoist cables and for conveyors, access to underground areas such as pumping stations, warehouses, workstations, crushers, and the like.

For example, FIG. 7 is a perspective, partial view of a hydro-electric site according to an embodiment. FIG. 8 is a side elevation, partial view of the hydro-electric site of FIG. 7. Referring at once to FIGS. 7 and 8, a hydro-electric site 400 comprises a starting station 404, a lower shaft 406, an expansion chamber 408, a penstock 412, and an arrival station 414. FIG. 8 further shows that the penstock 412 is dug within a rock mass 422, at an incline 424 of about 25 degrees from horizontal. This value of the incline 424 is for illustration purposes and the penstock 412 could be dug at other angles. In particular, the angle of the incline 424 may vary along a path of the penstock 412.

The starting station 404 and the arrival station 414 are areas arranged for the installation of various equipment (not shown) including for example transport equipment, drilling equipment, electric, hydraulic and/or pneumatic power distribution systems, industrial water distribution systems, and the like. The lower shaft 406 is generally horizontal, provides access to the penstock 412 and allows hauling of rock debris. The expansion chamber 408 allows extraction of rock debris at the time of digging the penstock 412. The penstock 412 is excavated along a central axis of the hydro-electric site 400.

Construction and operation of the hydro-electric site 400 can be facilitated by installing the overhead rail system of FIGS. 3 and 4 on an upper surface, i.e. a roof, of the penstock 412.

FIG. 9 is a flow diagram showing operations of a method for constructing a penstock. A sequence 500 comprises several operations, some of which are optional and some of which may be executed in various order. The sequence 500 is therefore provided for illustration purposes and the shown order of operation does not limit the present disclosure. In the sequence 500, a path of a penstock to be dug within a rock mass, for example at an angle between 10 and 45 degrees from horizontal, is planned at operation 504. Operation 506 includes excavating a lower shaft that intersects the path of the penstock. Excavation of a starting station extending from the lower shaft and from a bottom of the path of the penstock is made at operation 508. The penstock per se is excavated at operation 510. If desired, an expansion chamber broadening a width of the penstock near the bottom of the path of the penstock is excavated at operation 512. Operation 516 includes excavating an arrival station overhanging above a top of the penstock. To facilitate construction of a hydro-electric site using the above operations and to facilitate operation of the site, an overhead rail system may be installed on an upper surface of the penstock at operation 520. The overhead rail system can be used for carrying equipment, extracted rock material, and workers up and down the penstock.

Those of ordinary skill in the art will realize that the description of the mining site, shallow angle mining method and method for constructing a penstock are illustrative only and are not intended to be in any way limiting. Other embodiments will readily suggest themselves to such persons with ordinary skill in the art having the benefit of the present disclosure. Furthermore, the disclosed mining site, shallow angle mining method and method for constructing a penstock may be customized to offer valuable solutions to existing needs and problems of economically digging underground tunnels at shallow angles.

In the interest of clarity, not all of the routine features of the implementations of the mining site, shallow angle mining method and method for constructing a penstock are shown and described. It will, of course, be appreciated that in the development of any such actual implementation of the mining site, shallow angle mining method and method for constructing a penstock, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of underground construction having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for constructing a penstock, comprising:
planning a path of the penstock to be dug along a central axis of a hydro-electric site within a rock mass;
excavating a lower shaft, the lower shaft having a generally continuous width along its length, the lower shaft intersecting the path of the penstock;
excavating a starting station extending from the lower shaft and from a bottom of the path of the penstock;
excavating the penstock, the penstock having a generally continuous width along its length;
excavating an arrival station projecting above a top of the penstock; and
excavating an expansion chamber enlarging the width of the penstock and enlarging the width of the lower shaft near the bottom of the path of the penstock.

2. The method of claim 1, wherein the penstock is dug at an angle between 10 and 45 degrees from horizontal.

3. The method of claim 1, wherein the lower shaft is generally horizontal.

4. The method of claim 1, wherein the lower shaft is generally perpendicular to the penstock.

5. The method of claim 1, wherein the starting station is generally perpendicular to the lower shaft.

6. The method of claim 1, comprising installing an overhead rail system on an upper surface of the penstock.

7. A hydro-electric site, comprising:
a penstock dug within a rock mass along a central axis of the hydro-electric site, the penstock having a generally continuous width along its length;
a lower shaft having a generally continuous width along its length, the lower shaft intersecting a path of the penstock;

a starting station extending from the lower shaft and from a bottom of the path of the penstock;

an arrival station projecting above a top of the penstock; and an expansion chamber enlarging the width of the penstock and enlarging the width of the lower shaft near the bottom of the path of the penstock.

8. The hydro-electric site of claim 7, wherein the penstock is dug at an angle between 10 and 45 degrees from horizontal.

9. The hydro-electric site of claim 7, comprising an overhead rail system installed on an upper surface of the penstock.

\* \* \* \* \*